US008023225B2

(12) United States Patent
Shimazawa et al.

(10) Patent No.: US 8,023,225 B2
(45) Date of Patent: Sep. 20, 2011

(54) THERMALLY ASSISTED MAGNETIC HEAD WITH OPTICAL WAVEGUIDE

(75) Inventors: Koji Shimazawa, Tokyo (JP); Hiraku Hirabayashi, Tokyo (JP); Kosuke Tanaka, Tokyo (JP); Eiji Komura, Tokyo (JP)

(73) Assignee: TDK Corporation, Tokyo (JP)

( * ) Notice: Subject to any disclaimer, the term of this patent is extended or adjusted under 35 U.S.C. 154(b) by 599 days.

(21) Appl. No.: 12/176,127

(22) Filed: Jul. 18, 2008

(65) Prior Publication Data
US 2009/0052076 A1 Feb. 26, 2009

(30) Foreign Application Priority Data
Aug. 23, 2007 (JP) .................. 2007-217371

(51) Int. Cl.
*G11B 7/135* (2006.01)
(52) U.S. Cl. ................................... 360/125.4
(58) Field of Classification Search ............... 360/125.4
See application file for complete search history.

(56) References Cited

U.S. PATENT DOCUMENTS

| | | | |
|---|---|---|---|
| 6,714,370 B2 * | 3/2004 | McDaniel et al. ............ 360/59 |
| 6,950,598 B1 | 9/2005 | Tawa et al. |
| 7,262,936 B2 * | 8/2007 | Hamann et al. ............... 360/128 |
| 7,310,205 B2 * | 12/2007 | Hsu et al. ...................... 360/317 |
| 7,310,206 B2 * | 12/2007 | Liu et al. ........................ 360/317 |
| 7,440,384 B2 * | 10/2008 | Eppler ..................... 369/112.27 |
| 7,483,229 B2 * | 1/2009 | Rausch et al. .................. 360/59 |
| 7,532,435 B2 * | 5/2009 | Dugas et al. ............ 360/125.74 |
| 7,538,978 B2 * | 5/2009 | Sato et al. ..................... 360/128 |
| 7,609,480 B2 * | 10/2009 | Shukh et al. ............ 360/125.74 |
| 7,710,686 B2 * | 5/2010 | Kim et al. ................... 360/125.3 |
| 7,821,880 B2 * | 10/2010 | Tanaka et al. .............. 369/13.33 |
| 7,852,587 B2 * | 12/2010 | Albrecht et al. ................ 360/59 |

FOREIGN PATENT DOCUMENTS

JP   A-2006-73105   3/2006

\* cited by examiner

*Primary Examiner* — Mark Blouin
(74) *Attorney, Agent, or Firm* — Oliff & Berridge PLC

(57) ABSTRACT

While an emitting position of light from an optical waveguide and a magnetic pole end part are made closer to each other, high-density writing onto a magnetic recording medium is realized.
A thermally assisted magnetic head comprises a main magnetic pole layer having a magnetic pole end part exposed at a medium-opposing surface opposing a magnetic disk, and an optical waveguide for deflecting laser light incident thereon into a laminating direction. The main magnetic pole layer is positioned on a side where the light is deflected by the optical waveguide. The magnetic pole end part projects to the side where the light is deflected by the optical waveguide. The optical waveguide projects more than the magnetic pole end part on the medium-opposing surface side.

6 Claims, 11 Drawing Sheets

Fig.8
(a)
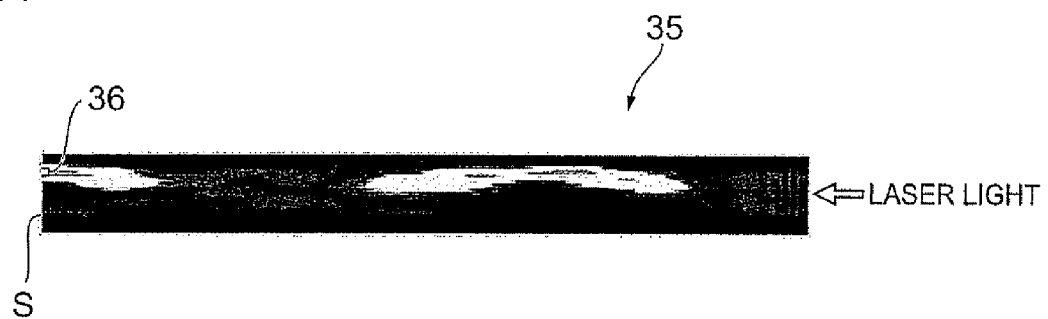
(b)
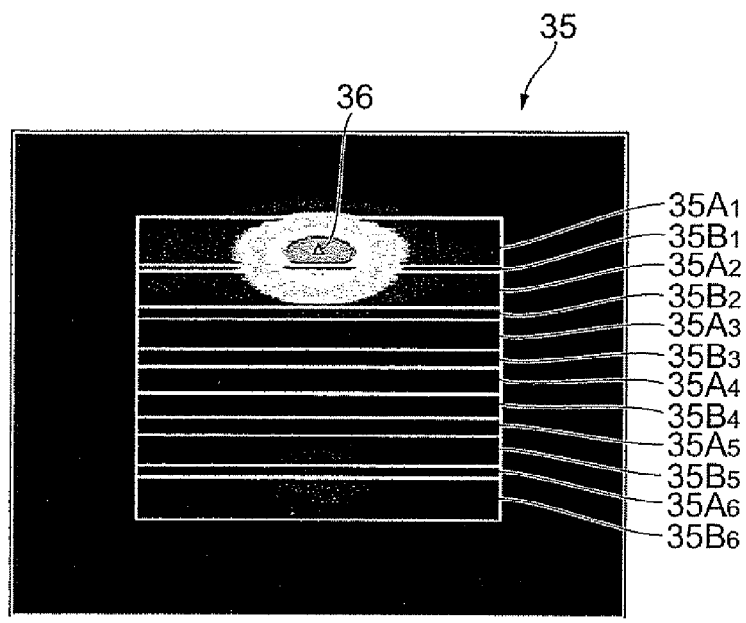

Fig.11
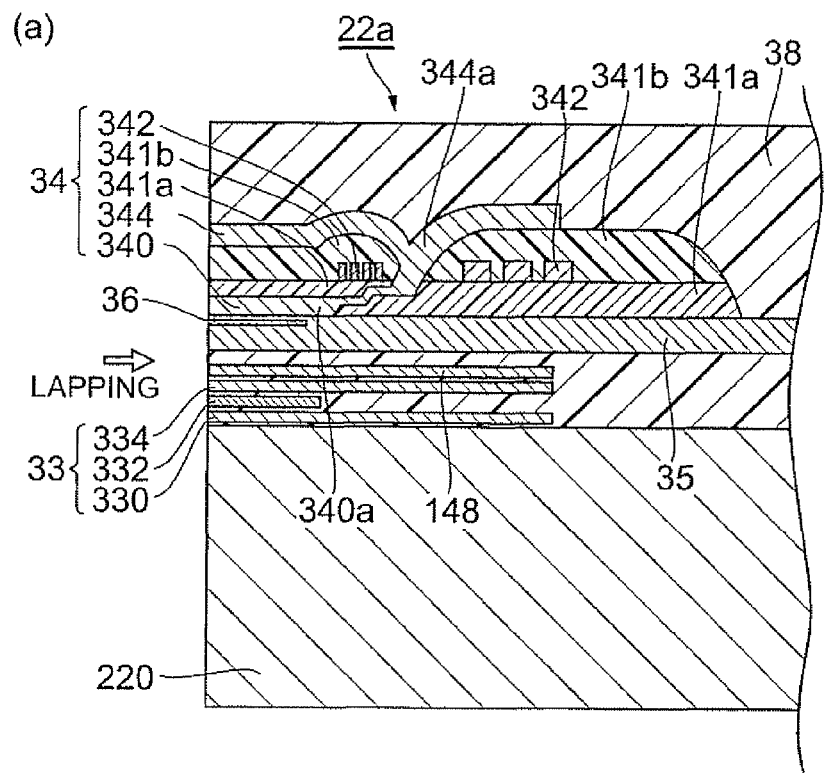
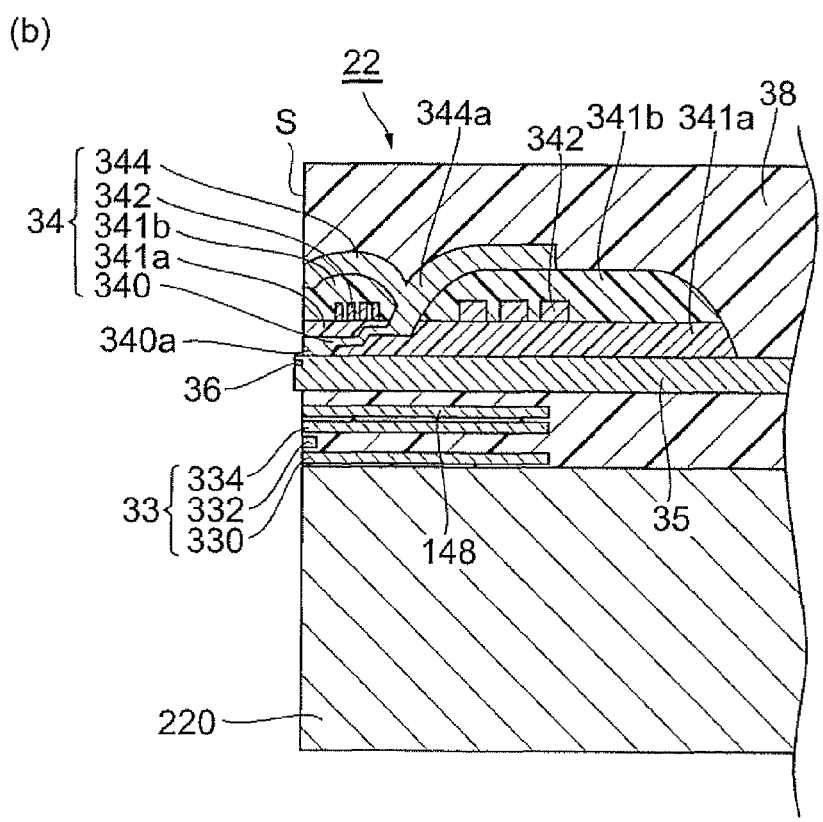

THERMALLY ASSISTED MAGNETIC HEAD WITH OPTICAL WAVEGUIDE

BACKGROUND OF THE INVENTION

1. Field of the Invention

The present invention relates to a thermally assisted magnetic head which writes signals by a thermally assisted magnetic recording scheme, a head gimbal assembly (HGA) equipped with this thermally assisted magnetic head, and a hard disk drive equipped with the HGA.

2. Related Background Art

As hard disk drives have been increasing their recording density, thin-film magnetic heads have been required to further improve their performances. As the thin-film magnetic heads, those of composite type having a structure in which a magnetism detecting device such as a magnetoresistive (MR) device and a magnetic recording device such as electromagnetic coil device are laminated have been in wide use, while these devices read/write data signals from/onto magnetic disks which are magnetic recording media.

In general, a magnetic recording medium is a sort of discontinuous body in which magnetic fine particles are assembled, while each magnetic fine particle has a single-domain structure. Here, one recording bit is constituted by a plurality of magnetic fine particles. Therefore, for enhancing the recording density, it is necessary to make the magnetic fine particles smaller, so as to reduce irregularities at boundaries of recording bits. When the magnetic fine particles are made smaller, however, their volume decreases, so that the thermal stability in magnetization may deteriorate, thereby causing a problem.

An index of the thermal stability in magnetization is given by $K_U V/k_B T$. Here, $K_U$ is the magnetic anisotropy energy of a magnetic fine particle, V is the volume of one magnetic fine particle, $k_B$ is the Boltzmann constant, and T is the absolute temperature. Making the magnetic fine particles smaller just reduces V, which lowers $K_U V/k_B T$ by itself, thereby worsens the thermal stability. Though $K_U$ may be made greater at the same time as measures against this problem, the increase in $K_U$ enhances the coercivity of the magnetic recording medium. On the other hand, the writing magnetic field intensity caused by a magnetic head is substantially determined by the saturated magnetic flux density of a soft magnetic material constituting a magnetic pole within the head. Therefore, no writing can be made if the coercivity exceeds a permissible value determined by the limit of writing magnetic field intensity.

Proposed as a method for solving such a problem in thermal stability of magnetization is a so-called thermally assisted magnetic recording scheme which applies heat to a magnetic recording medium immediately before applying a writing magnetic field, while using a magnetic material having a large value of $K_U$, so as to effect writing with lowered coercivity. This scheme is roughly classified into magnetic dominant recording and optical dominant recording. In the magnetic dominant recording, the writing is attributed to an electromagnetic coil device, while the radiation diameter of light is greater than the track width (recording width). In the optical dominant recording, in contrast, the writing is attributed to a light-radiating part, while the radiation diameter of light is substantially the same as the track width (recording width). Namely, the magnetic dominant recording and optical dominant recording impart space resolution to a magnetic field and light, respectively.

As such thermally assisted magnetic head recording apparatus, Patent Documents 1 and 2 and Nonpatent Document 1 disclose structures in which a light source such as semiconductor laser is provided at a position separated from a slider equipped with a magnetic recording device for generating a magnetic field, while light from the light source is guided to the medium-opposing surface of the slider through an optical fiber, a lens, and the like.

Patent Documents 3 and 4 disclose thermally assisted magnetic heads in which a magnetic recording device and a light source are integrated on a side face or medium-opposing surface of a slider.

Patent Documents 5 and 6 disclose thermally assisted magnetic heads in which an optical waveguide is provided at a position near an electromagnetic coil device in the laminating direction of a magnetic head (bit length direction). In this structure, light emitted from a light-emitting device is introduced into the optical waveguide and then is let out from a light exit surface of the optical waveguide within the medium-opposing surface, so as to heat a magnetic recording medium locally. Subsequently, the electromagnetic coil device applies a writing magnetic field to a local area of the magnetic recording medium having lowered the coercivity by the local heating, so as to perform writing.

Nonpatent Document 2 discloses a thermally assisted magnetic head in which a magnetic pole end part, which is a part exposed to the medium-opposing surface in the main magnetic pole layer, projects toward the optical waveguide.

Nonpatent Document 3 discloses a magnetic recording medium used for thermally assisted magnetic recording such as those mentioned above.

Patent Document 7 discloses a light-radiating device in which electromagnetic waves such as light propagated through a core are deflected by a deflecting structure to a base part formed with a magnetic head or the like.

[Patent Document 1] Japanese Patent Application Laid-Open No. 10-162444
[Patent Document 2] Japanese Patent Application Laid-Open No. 2001-255254
[Patent Document 3] Japanese Patent Application Laid-Open No. 2004-158067
[Patent Document 4] Japanese Patent Application Laid-Open No. 2005-004901
[Patent Document 5] Japanese Patent Application Laid-Open No. 2005-190655
[Patent Document 6] Japanese Patent Application Laid-Open No. 2006-185548
[Patent Document 7] Japanese Patent Application Laid-Open No. 2006-331508
[Nonpatent Document 1] Shintaro Miyanishi, et al., "Near-Field Assisted Magnetic Recording", IEEE Transactions on Magnetics, 2005, Vol. 41, No. 10, pp. 2817-2821
[Nonpatent Document 2] Micheal A. Seigler, et al., "Progress and Prospects in Heat Assisted Magnetic Recording", in Optical Data Storage, OSA Technical Digest Series (CD) (Optical Society of America, 2007), paper TuA1
[Nonpatent Document 3] Jan-Ulrich Thiele, et al., "Magnetic and Structural Properties of FePt—FeRh Exchange Spring Films for Thermally Assisted Magnetic Recording Media", IEEE Transactions on Magnetics, 2004, Vol. 40, No. 4, p. 2537

SUMMARY OF THE INVENTION

Even when a magnetic recording medium is heated by irradiation with light, so as to lower its coercivity, the magnetic recording medium is cooled as time passes, whereby the coercivity returns to its original state. It will therefore be desirable if the position where light is emitted from the optical waveguide and the magnetic pole end part are as close as possible to each other, so that, immediately after heating the magnetic recording medium, magnetic recording is performed in the heated part. Here, projecting the magnetic pole end part to the optical waveguide as in the above-mentioned Nonpatent Document 2 or deflecting light by the optical waveguide as in the above-mentioned Patent Document 7 is effective means for reducing the distance between the emitting position of light from the optical waveguide and the magnetic pole end part.

When the emitting position of light from the optical waveguide and the magnetic pole end part are to be made further closer to each other by such means, however, part of the light deflected by the optical waveguide may irradiate the magnetic pole end part. Here, the magnetic pole end part may lower its coercivity when heated, thus causing a problem that writing onto the magnetic recording medium cannot be performed well.

It is therefore an object of the present invention to provide a thermally assisted magnetic head, a head gimbal assembly, and a hard disk drive, which can realize high-density writing onto magnetic recording media while making the emitting position of light from the optical waveguide and the magnetic pole end part closer to each other.

The thermally assisted magnetic head in accordance with the present invention comprises a main magnetic pole layer having a magnetic pole end part exposed at a medium-opposing surface opposing a magnetic recording medium; and an optical waveguide including a first layer and a second layer, adjacent to the first layer, having a refractive index higher than that of the first layer and deflecting thermally assisting light incident thereon into a laminating direction; wherein the main magnetic pole layer is positioned on a side where the light is deflected by the optical waveguide; wherein the magnetic pole end part projects to the side where the light is deflected by the optical waveguide; and wherein the optical waveguide projects more than the magnetic pole end part on the medium-opposing surface side.

In the thermally assisted magnetic head in accordance with the present invention, the main magnetic pole layer is positioned on the side where the light is deflected by the optical waveguide, while the magnetic pole end part projects to the side where the light is deflected by the optical waveguide. Therefore, the emitting position of light from the optical waveguide and the magnetic pole end part are closer to each other than in conventional thermally assisted magnetic heads, so that, immediately after heating the magnetic recording medium, magnetic recording can be performed in the heated part. Also, in the thermally assisted magnetic head in accordance with the present invention, the optical waveguide projects more than the magnetic pole end part on the medium-opposing surface side. Therefore, as compared with a case where the light exit surface of the optical waveguide and the medium-opposing surface are flush with each other as in the conventional thermally assisted magnetic heads, a greater distance can be secured between light and the magnetic pole end part when the light passes near the magnetic pole end part even if the light is deflected toward the main magnetic pole (magnetic pole end part) while advancing. As a result, the decrease in coercivity by heating of the magnetic pole end part is very hard to occur, whereby the thermally assisted magnetic head in accordance with the present invention can realize high-density writing onto the recording medium while making the emitting position of light from the optical waveguide and the magnetic pole end part closer to each other.

Further, since the optical waveguide projects more than the magnetic pole end part on the medium-opposing surface side, the light exit surface of the optical waveguide is located closer to the recording medium in the thermally assisted magnetic head in accordance with the present invention than in the conventional thermally assisted magnetic heads when the flying height from the magnetic medium is the same. Therefore, the light emitted from the optical waveguide irradiates the magnetic recording medium while having higher emission intensity. As a result, the thermally assisted magnetic head in accordance with the present invention can effectively prevent the magnetic recording medium from being insufficiently heated, so as to enable favorable writing onto the magnetic recording medium.

Preferably, with respect to an alkaline polishing solvent used for chemical mechanical polishing, the optical waveguide exhibits an etching rate lower than that of the main magnetic pole layer and an insulating layer provided so as to surround the main magnetic pole layer. In this case, lapping the medium-opposing surface by chemical mechanical polishing in the process of manufacturing the thermally assisted magnetic head allows the thermally assisted magnetic head to attain a structure in which the optical waveguide projects more than the magnetic pole end part on the medium-opposing surface side.

More preferably, the optical waveguide is formed by an oxide such as tantalum oxide, titanium oxide, or silicon oxide; a nitride such as tantalum nitride, titanium nitride, or silicon nitride; or an oxynitride such as tantalum oxynitride, titanium oxynitride, or silicon oxynitride; in particular, tantalum oxide, titanium oxide, silicon oxide, tantalum nitride, titanium nitride, silicon nitride, tantalum oxynitride, titanium oxynitride, silicon oxynitride, or a material mainly composed of any of the above. When the optical waveguide is formed by silicon nitride (SiN) or silicon oxynitride (SiON), it will be preferred if about 3 wt % to 15 wt % of silicon nitride or silicon oxynitride is substituted by $ZrO_2$, $SnO_2$, $Cr_2O_3$, or $La_2O_3$ in order to improve its resistance to alkalis.

Preferably, a near-field-light-emitting part is provided at an end face of the optical waveguide on the medium-opposing surface side. This allows near-field light to locally heat the magnetic recording medium.

Preferably, the magnetic pole end part is in contact with the optical waveguide. This can make the emitting position of light from the optical waveguide and the magnetic pole end part further closer to each other.

The head gimbal assembly in accordance with the present invention comprises the thermally assisted magnetic head in accordance with the present invention and a suspension for supporting the thermally assisted magnetic head.

The hard disk in accordance with the present invention comprises the head gimbal assembly in accordance with the present invention and a magnetic recording medium opposing the medium-opposing surface.

The present invention can provide a thermally assisted magnetic head, a head gimbal assembly, and a hard disk drive, which can realize high-density writing onto magnetic recording media while making the emitting position of light from the optical waveguide and the magnetic pole end part closer to each other.

The present invention will be more fully understood from the detailed description given here in below and the accompanying drawings which are given by way of illustration only, and thus are not to be considered as limiting the present invention.

Figure 9:
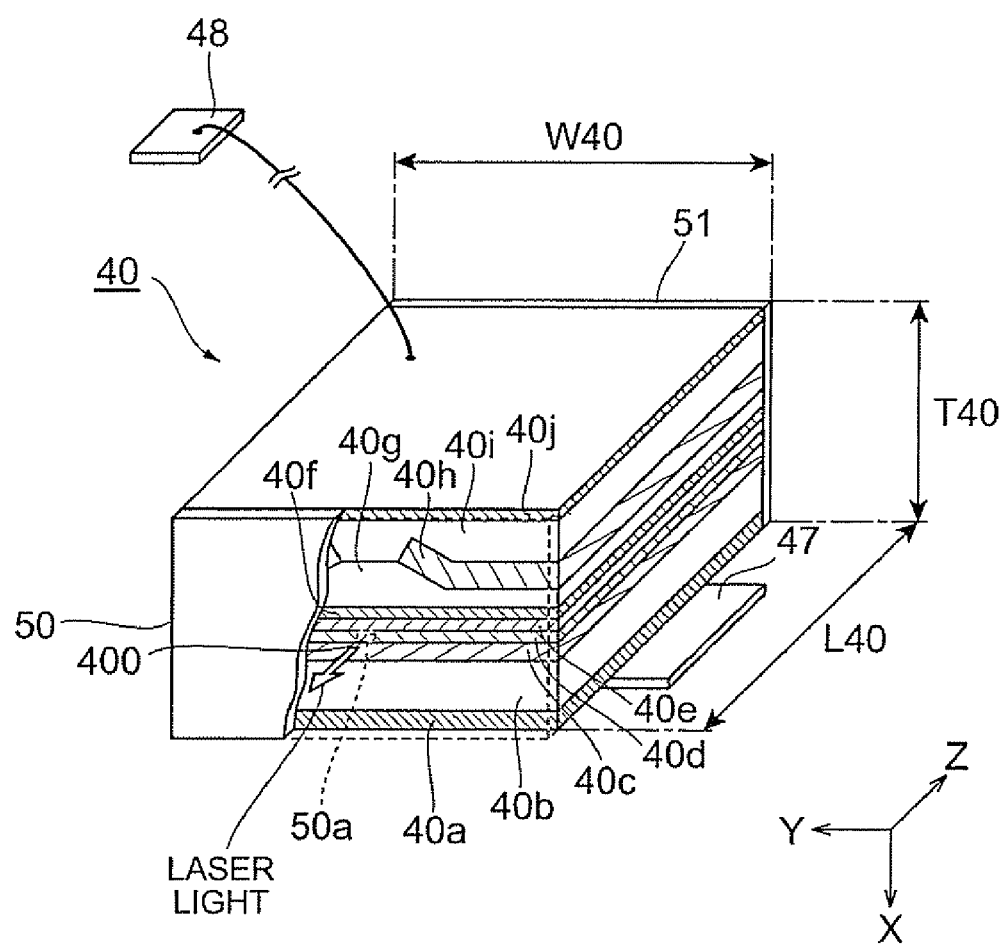
Figure 10:
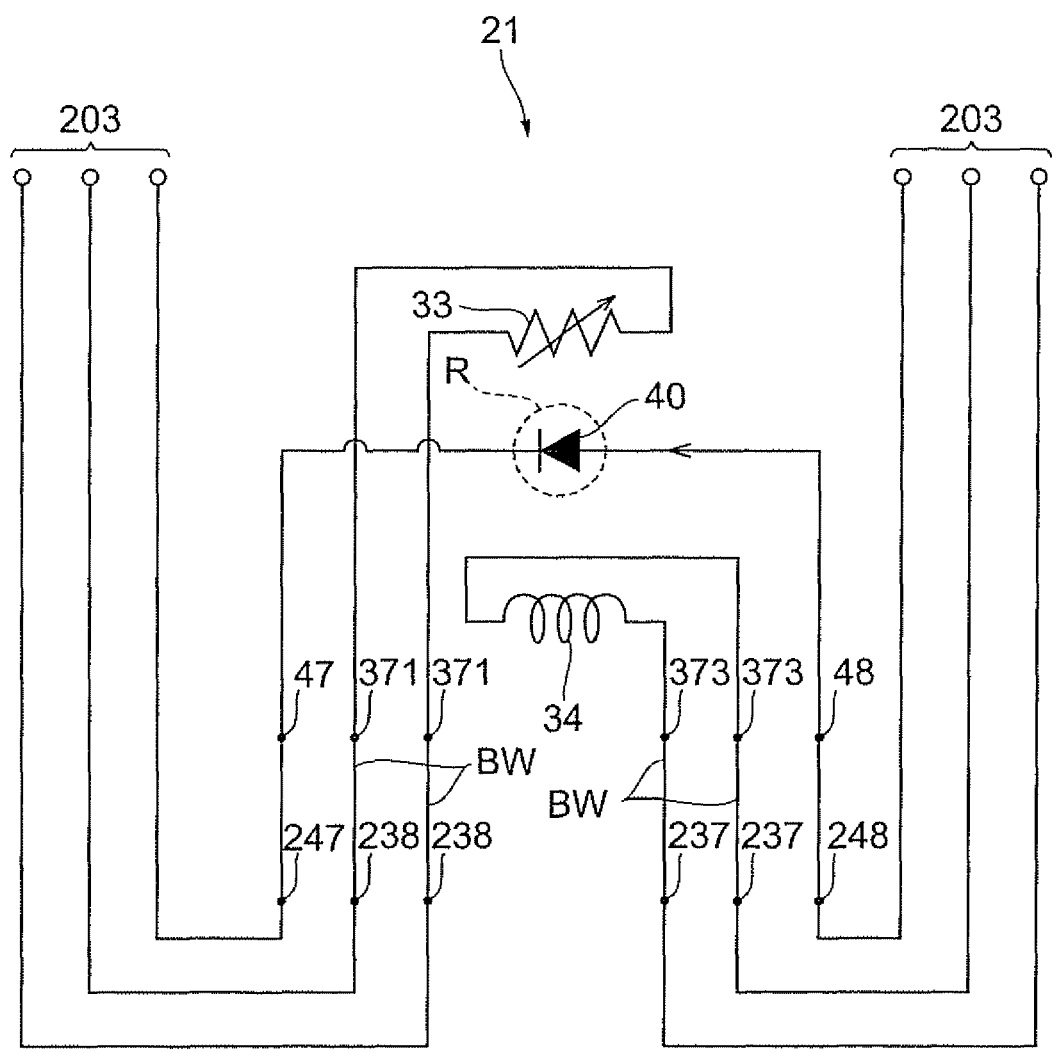

(a) of FIG. 8 is a transverse sectional view showing results of a simulation when laser light is introduced to the optical waveguide, while (b) of FIG. 8 is a view showing results of the simulation when laser light is introduced to the optical waveguide as seen from the medium-opposing surface;

FIG. 9 is a perspective view showing a laser diode;

FIG. 10 is a diagram showing a circuit configuration of the thermally assisted magnetic head; and FIG. 11 is a view for explaining a process of lapping.

DESCRIPTION OF THE PREFERRED EMBODIMENTS

Preferred embodiments of the present invention will be explained with reference to the drawings. In the explanation, the same constituents or those having the same functions will be referred to with the same numerals or letters while omitting their overlapping descriptions. For easier viewing of the drawings, ratios of dimensions within and among the constituents in the drawings are arbitrary.

[1] Structure of Hard Disk Drive

Figure 1:
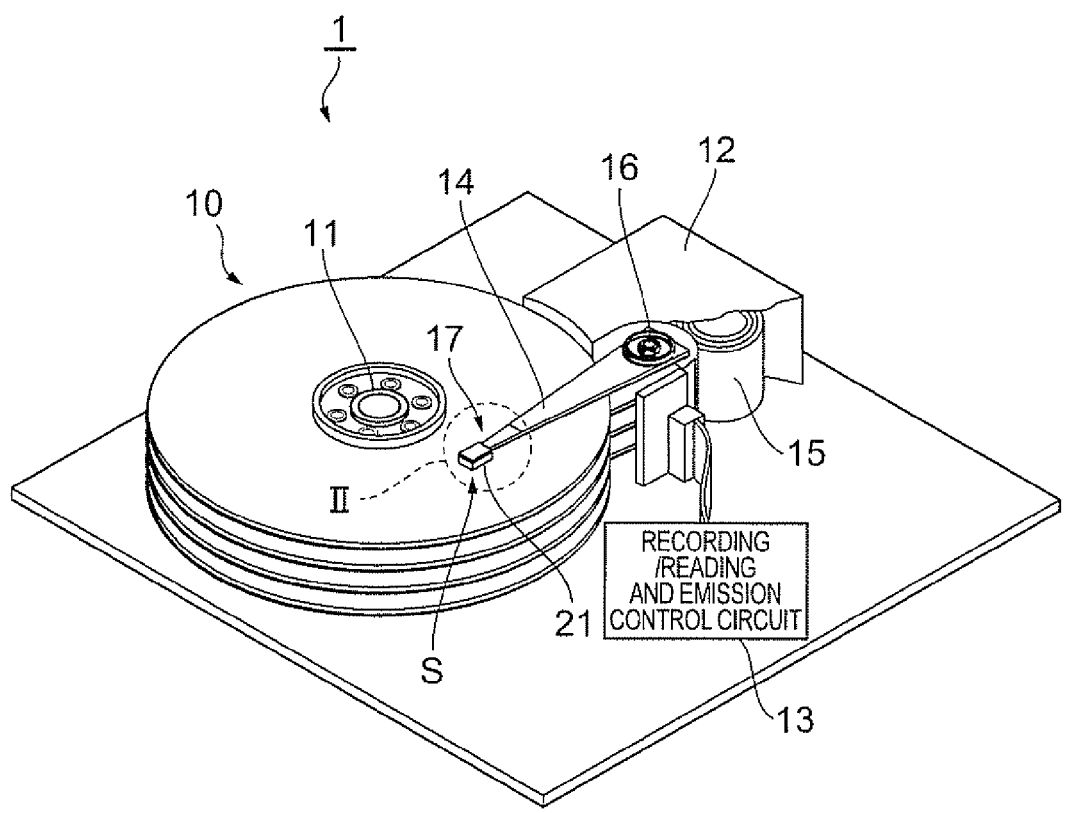
FIG. 1 is a perspective view showing a hard disk drive.

First, with reference to FIG. 1, the structure of a hard disk drive 1 will be explained. The hard disk drive 1 comprises a plurality of magnetic disks (magnetic recording media) 10 rotating about a rotary shaft of a spindle motor 11, an assembly carriage apparatus 12 for positioning thermally assisted magnetic heads 21 onto tracks, and a recording, reading, and emission control circuit 13 for controlling writing and reading actions by the thermally assisted magnetic heads 21 and regulating a laser diode 40 which is a light source for emitting laser light for thermally assisted magnetic recording.

The assembly carriage apparatus 12 is provided with a plurality of driving arms 14. These driving arms 14 can be swung about a pivot bearing shaft 16 by a voice coil motor (VCM) 15, and are laminated in a direction along the pivot bearing shaft 16. A head gimbal assembly (HGA) 17 is attached to a leading end part of each driving arm 14. Each HGA 17 is provided with the thermally assisted magnetic head 21 opposing the front face of its corresponding magnetic disk 10. In the thermally assisted magnetic head 21, the surface opposing the front face of the magnetic disk 10 is the medium-opposing surface (also known as air bearing surface or ABS) S. The magnetic disk 10, driving arm 14, HGA 17, and thermally assisted magnetic head 21 may be provided singly as well.

[2] Structure of Head Gimbal Assembly

Figure 2:
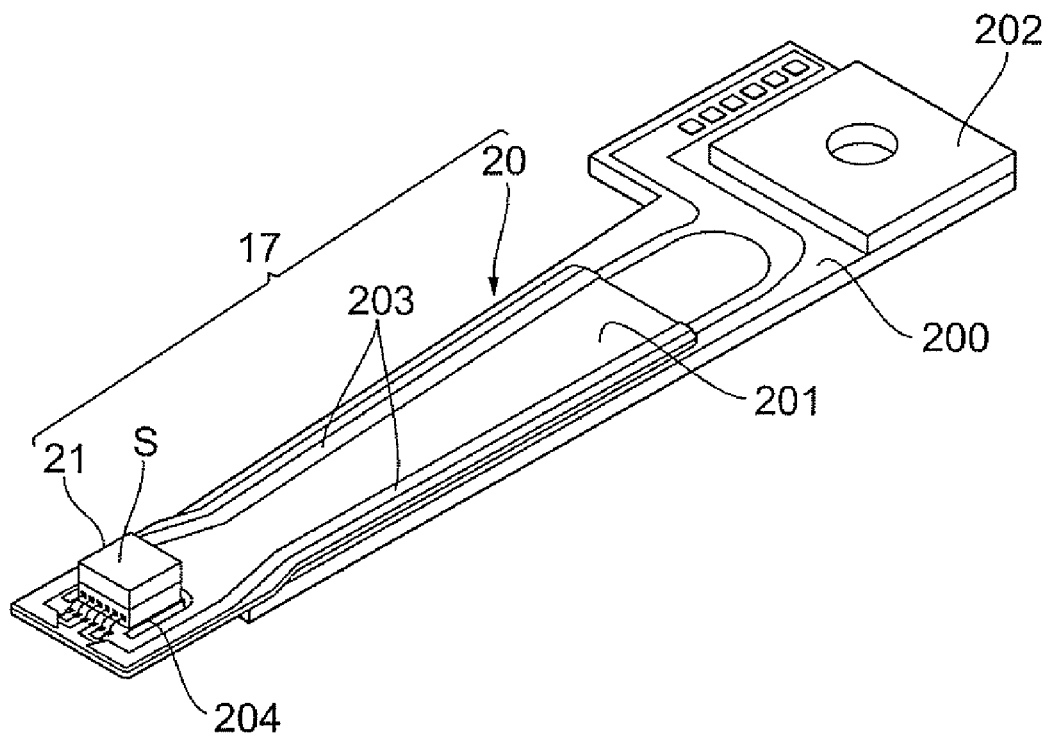
FIG. 2 is a perspective view of a head gimbal assembly showing a thermally assisted magnetic head in a state where its medium-opposing surface faces up.

The structure of the HGA 17 will now be explained with reference to FIG. 2. The HGA 17 is constructed by firmly attaching the thermally assisted magnetic head 21 to a leading end part of a suspension 20. The suspension 20 is mainly constituted by a load beam 200, an elastic flexure 201 firmly attached onto and supported by the load beam 200, a base plate 202 provided at a base part of the load beam 200, a wiring member 203 which is formed on the flexure 201 and comprises lead conductors and connecting pads electrically connected to both ends of the lead conductors, and a tongue 204 formed like a leaf spring at the leading end of the flexure 201. The suspension 20 in the HGA 17 is not limited to the structure mentioned above. Though not depicted, an IC chip for driving the head may be mounted somewhere in the suspension 20.

[3] Structure of Thermally Assisted Magnetic Head

The structure of the thermally assisted magnetic head 21 will now be explained with reference to FIGS. 3 to 9. The thermally assisted magnetic head 21 comprises a slider 22 having a slider substrate 220 and a magnetic head part 32 for writing and reading data, and a light source unit 23 having a light source supporting substrate 230 and a laser diode (light-emitting device) 40 acting as a light source for thermally assisted magnetic recording. The slider substrate 220 and the light source supporting substrate 230 are firmly attached to each other by an adhesive 44 such as UV-curable epoxy resin or UV curable acrylic resin in a state where a back face 2201 of the slider substrate 220 and a bonding surface 2300 of the light source supporting substrate 230 are in contact with each other (see FIG. 4).

Here, the back face 2201 of the slider substrate 220 is a surface positioned on the opposite side of the slider 22 from the medium-opposing surface S. The bottom face 2301 of the light source supporting substrate 230 is firmly attached to the tongue 204 of the flexure 201 by an adhesive such as epoxy resin.

[3.1] Slider

Figure 3:
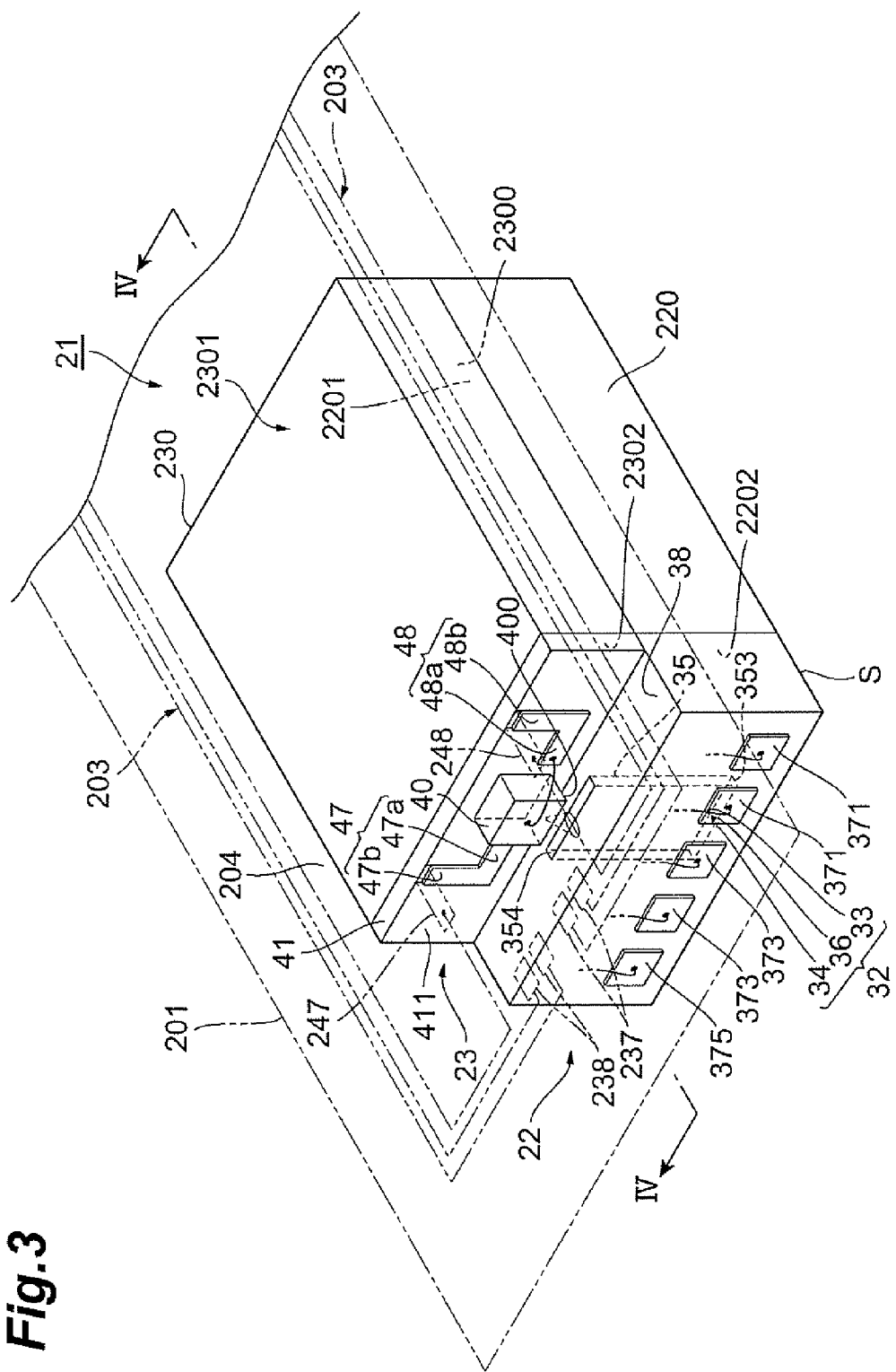
FIG. 3 is a perspective view showing the thermally assisted magnetic head.

The slider substrate 220 in the slider 22 has a planar form as shown in FIG. 3. The medium-opposing surface S of the slider substrate 220 is processed into a predetermined form such that the thermally assisted magnetic head 21 can attain an appropriate flying height. The slider substrate 220 can be formed by AlTiC ($Al_2O_3$.TiC) or the like which is conductive.

Figure 4:
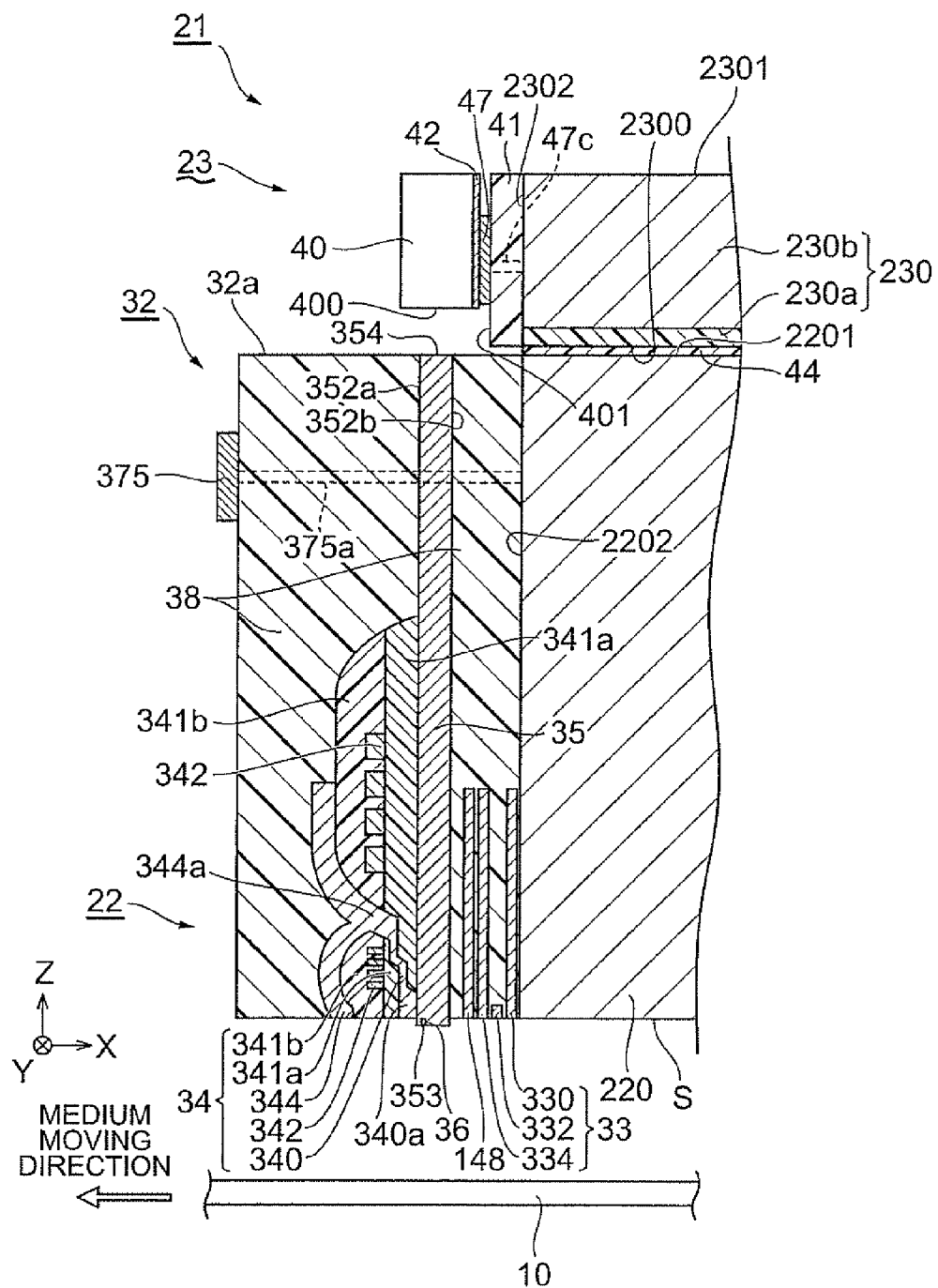
FIG. 4 is a sectional view taken along the line IV-IV of FIG. 3.

As shown in FIGS. 3 and 4, the magnetic head part 32 in the slider 22 is provided on an integration surface 2202 which is a side face substantially perpendicular to the medium-opposing surface S of the slider substrate 220. The magnetic head part 32 comprises a reading head part 33 having an MR device 332, a recording head part 34 as an inductive electromagnetic transducer for writing, an optical waveguide 35 provided between the reading head part 33 and recording head part 34, a near-field-light-generating part (plasmon probe) 36 for generating near-field light for heating a recording layer part of the magnetic disk 10, and an insulating layer 38 formed on the integration surface so as to cover the reading head part 33, recording head part 34, optical waveguide 35, and near-field-light-generating part 36.

As shown in FIG. 4, the reading head part 33 is constructed by laminating a lower magnetic shield layer 330 also acting as a lower electrode, an MR device 332, and an upper magnetic shield layer 334 also acting as an upper electrode in this order on the slider substrate 220. A pair of bias application layers HM made of a hard magnetic material (see FIG. 7) is formed on both sides in the track width direction of the MR device 332 by way of the insulating layer 38.

The lower and upper magnetic shield layers 330, 334 are made of a soft magnetic material such as NiFe, CoFeNi, CoFe, FeN, or FeZrN and prevent the MR device 332 from sensing unnecessary external magnetic fields. The lower and upper magnetic shield layers 330, 334 can be formed by pattern plating such as frame plating by a thickness of about 0.5 µm to 3 µm each, for example.

The MR device 332 has a multilayer structure including a free layer (not depicted) and is arranged on the medium-opposing surface S side so as to be exposed at the medium-opposing surface S. Utilizing a magnetoresistive effect, the MR device 332 detects a change in a magnetic field inputted from the magnetic disk 10, thereby reading magnetic information recorded on the magnetic disk 10. GMR (giant magnetoresistive) devices utilizing a giant magnetoresistive effect yielding a high magnetoresistance change ratio, AMR (anisotropic magnetoresistive) devices utilizing an anisotropic magnetoresistive effect, TMR (tunneling magnetoresistive) devices utilizing a magnetoresistive effect occurring at a tunneling junction, CPP (Current Perpendicular to Plane)-GMR devices, and the like may be used in place of the MR device 332.

The recording head part 34 has a main magnetic pole layer 340, a gap layer 341a, a thin-film coil insulating layer 341b, a thin-film coil 342, and an auxiliary magnetic pole layer 344. The main magnetic pole layer 340 is a magnetic waveguide by which a magnetic flux induced by the thin-film coil 342 is guided to the recording layer of the magnetic disk 10 to be recorded while being converged, and extends from the spiral center of the thin-film coil 342 to the medium-opposing surface S. The main magnetic pole layer 340 includes a magnetic pole end part 340a which is positioned on the medium-opposing surface S side and exposed at the medium-opposing surface S. When the thin-film coil 342 is energized, a magnetic field is guided to the magnetic pole end part 340a of the main magnetic pole layer 340, whereby its leading end generates a writing magnetic field.

Figure 5:
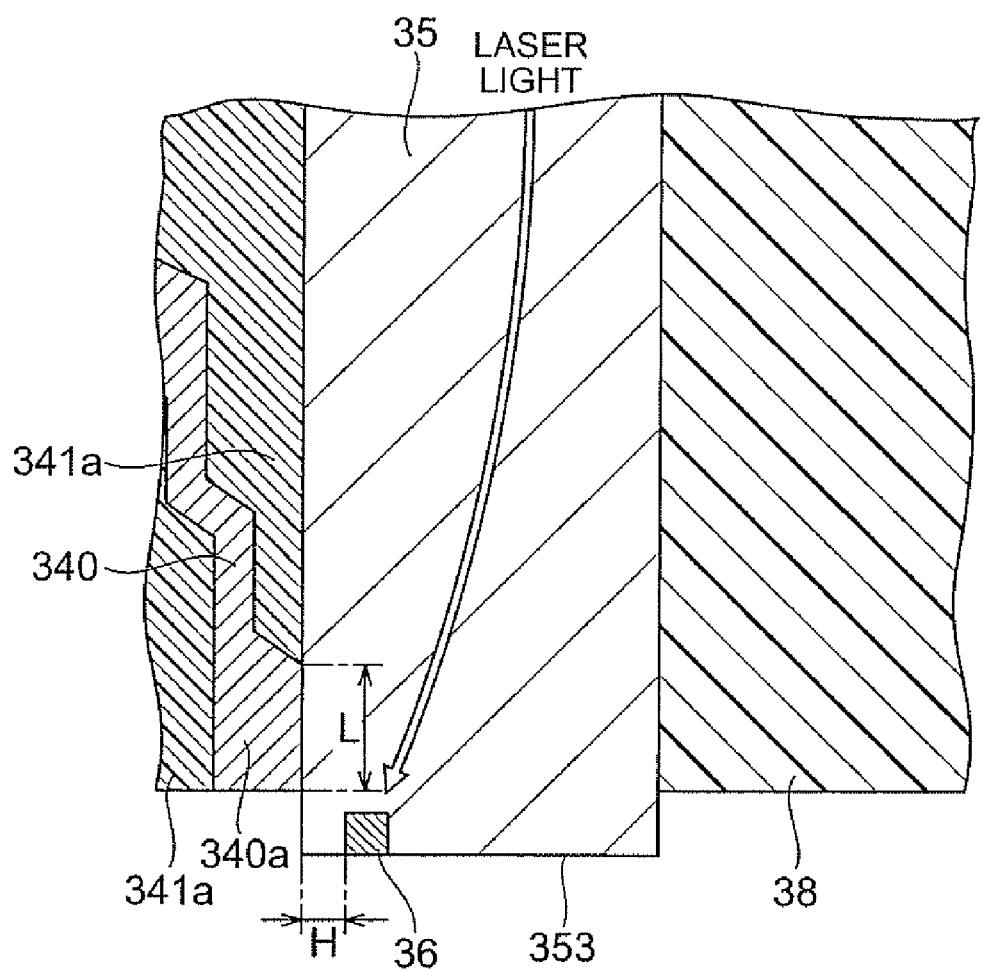
FIG. 5 is a view showing under magnification the magnetic pole and optical waveguide of FIG. 4 and their vicinity.
Figure 6:
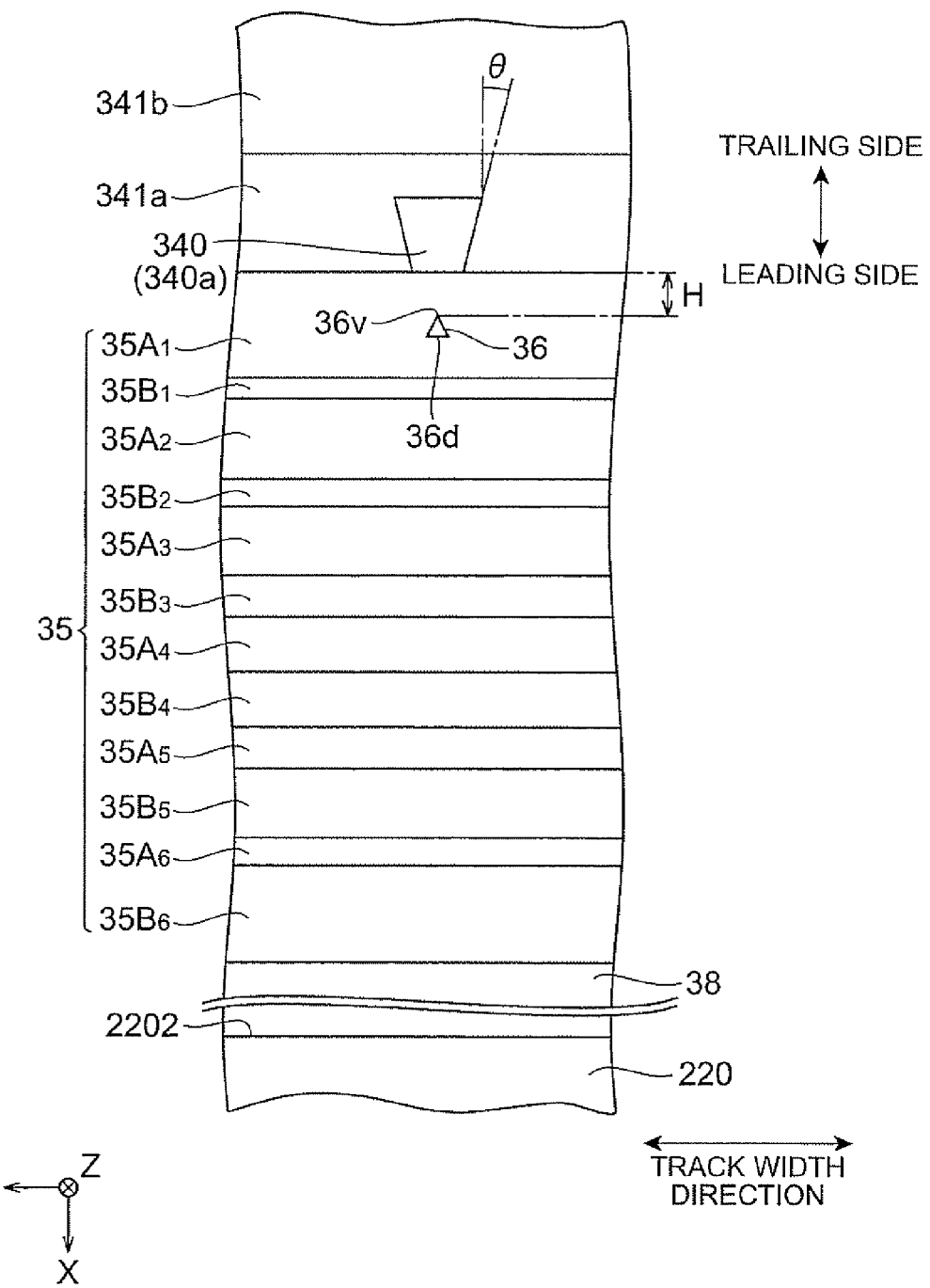
FIG. 6 is a partly enlarged view of the magnetic pole end part and optical waveguide as seen from the medium-opposing surface.

As shown in FIGS. 4 to 6, the surface of the magnetic pole end part 340a on the optical waveguide 35 side is in contact with the optical waveguide 35. Preferably, the magnetic pole end part 340a is in contact with the optical waveguide 35 by a length L of 0.1 µm to 2.0 µm in the depth direction with respect to the medium-opposing surface S.

Preferably, the magnetic pole end part 340a is made smaller than the other parts in terms of the width in the track width direction and the thickness in the laminating direction (horizontal direction in FIG. 4). As a result, a fine, strong writing magnetic field adapted to higher recording density can be generated. Specifically, it will be preferred if the leading end of the magnetic pole end part 340a is tapered such as to form an inverted trapezoid in which a side on the leading side, i.e., the slider substrate 220 side, is shorter than a side on the trailing side. Namely, each of the end faces of the magnetic pole end part 340a is provided with a bevel angle θ so as not to cause unnecessary writing and the like in adjacent tracks under the influence of skew angles generated when driven by a rotary actuator. The bevel angle θ is about 15°, for example. The writing magnetic field is mainly generated near the longer side on the trailing side, while the length of the longer side determines the width of a writing track in the case of magnetic dominant recording.

Here, the main magnetic pole layer 340 is preferably constituted by an alloy made of two or three elements among Ni, Fe, and Co, an alloy mainly composed of them and doped with a predetermined element, or the like. The main magnetic pole layer 340 can be formed by frame plating, sputtering, or the like. The thickness of the magnetic pole end part 340a can be set to about 0.01 µm to 0.5 µm, for example, while the thickness of the main magnetic pole layer 340 in the part other than the magnetic pole end part 340a can be set to about 0.5 µm to 3.0 µm, for example. The track width can be set to about 100 nm, for example.

The auxiliary magnetic pole layer 344 is magnetically connected to the main magnetic pole layer 340 at an end part 344a on the side remote from the medium-opposing surface S. The end part of the auxiliary magnetic pole layer 344 on the medium-opposing surface S side forms a trailing shield part having a layer cross section wider than the other part of the auxiliary magnetic pole layer 344. The end part of the auxiliary magnetic pole layer 344 on the medium-opposing surface S side is exposed at the medium-opposing surface S. Since the gap layer 341a and thin-film coil insulating layer 341b are interposed between the main magnetic pole layer 340 and auxiliary magnetic pole layer 344, the end part of the auxiliary magnetic pole layer 344 on the medium-opposing surface S side opposes the magnetic pole end part 340a of the main magnetic pole layer 340 with a predetermined gap therebetween.

The auxiliary magnetic pole layer 344 is preferably constituted by an alloy made of two or three elements among Ni, Fe, and Co, an alloy mainly composed of them and doped with a predetermined element, or the like. The auxiliary magnetic pole layer 344 can be formed by frame plating, sputtering, or the like. The thickness of the auxiliary magnetic pole layer 344 can be set to about 0.5 µm to 5 µm, for example.

For electrically insulating the main magnetic pole layer 340 and thin-film coil 342 from each other, the gap layer 341a is constituted by $Al_2O_3$, AlN, or the like and can be formed by sputtering, CVD, or the like. The thickness of the gap layer 341a can be set to about 0.01 µm to 0.5 µm, for example.

For electrically insulating the thin-film coil 342 and auxiliary magnetic pole layer 344 from each other, the thin-film coil insulating layer 341b is constituted by alumina, a resist which is an organic insulating material, or the like. The thickness of the thin-film coil insulating layer 341b can be set to about 0.1 µm to 5 µm, for example.

The thin-film coil 342 is constructed like a spiral in which a lead is wound about the end part 344a of the auxiliary magnetic pole layer 344. The thin-film coil 342 can be constituted by Cu or the like. The thickness of the thin-film coil 342 can be set to about 0.5 µm to 3 µm, for example.

As shown in FIG. 4, the optical waveguide 35 is arranged between the reading head part 33 and recording head part 34, and extends from the medium-opposing surface S of the magnetic head part 32 to the surface 32a of the magnetic head part 32 on the side opposite from the medium-opposing surface S so as to become parallel to the integration surface 2202. More specifically, as shown in FIG. 4, the end part of the optical waveguide 35 on the medium-opposing surface S side projects more than the magnetic pole end part 340a in the medium-opposing surface S. The end face of the optical waveguide 35 on the medium-opposing surface S side is a light exit surface 353 from which the laser light generated by the laser diode 40 is emitted, while the end face on the side opposite from the light exit surface 353 is a light entrance surface 354 on which the laser light generated by the laser diode 40 is incident (see FIGS. 4 and 7).

Figure 7:
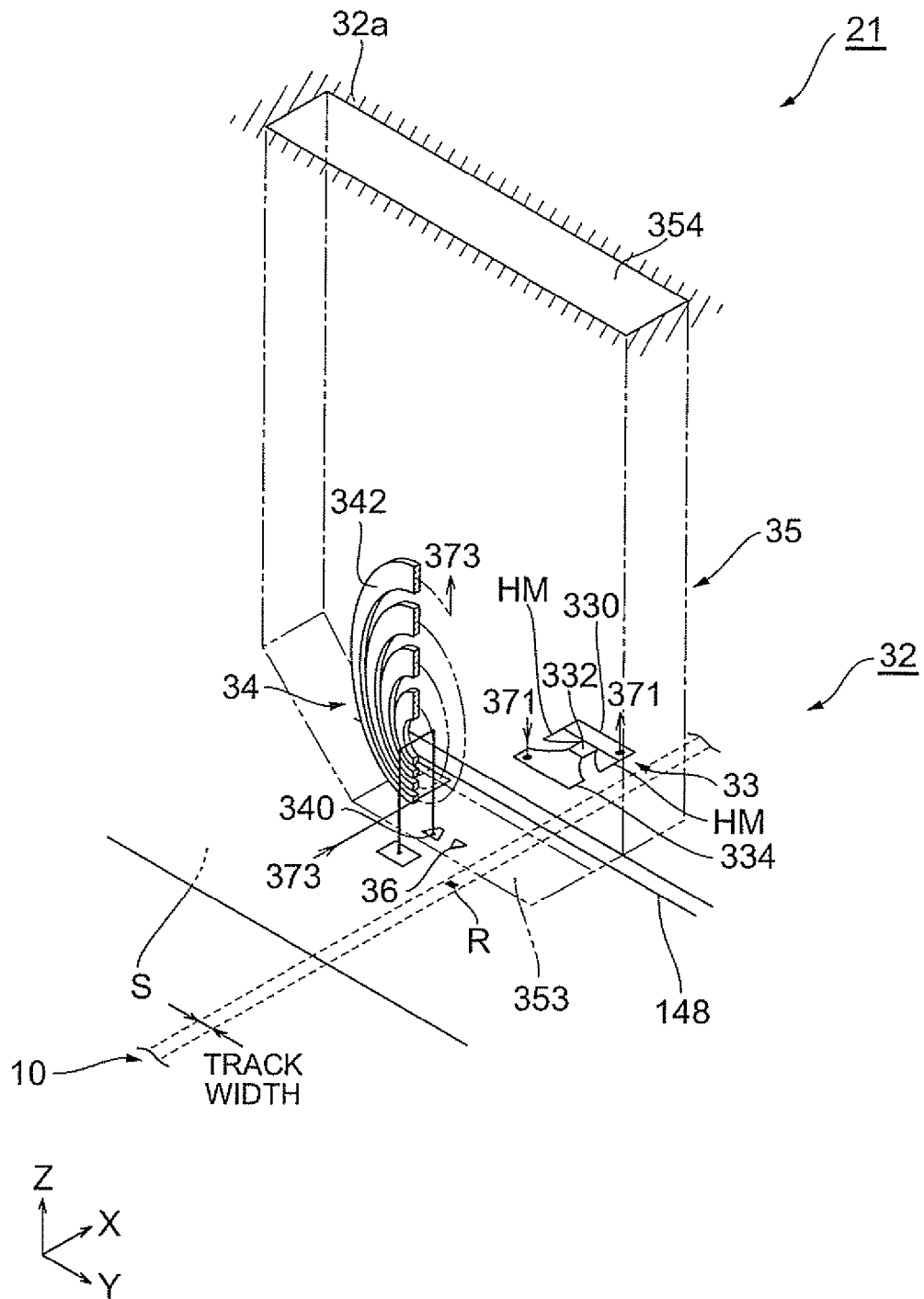
FIG. 7 is a perspective view showing a main part of the thermally assisted magnetic head.

As shown in FIG. 7, the optical waveguide 35 is mainly formed like a substantially rectangular plate, while both corner portions in the track width direction of its end part on the medium-opposing surface S side are chamfered. Therefore, the end part of the optical waveguide 35 on the medium-opposing surface S side reduces its width in the track width direction toward the medium-opposing surface S. This makes it possible for the optical waveguide 35 to converge the laser light from the laser diode 40 at the center part in the track width direction. Here, the surface 32a is substantially parallel to the medium-opposing surface S.

As shown in FIG. 6, the optical waveguide 35 has a plurality of cores $35A_1$ to $35A_6$, $35B_1$ to $35B_6$, which are laminated alternately. Each of the cores $35A_1$ to $35A_6$ is constituted by SiON and set such as to exhibit a refractive index of about 1.80. The respective thicknesses of the cores $35A_1$ to $35A_6$ are set to about 400, 300, 250, 200, 150, and 100 nm. Namely, the cores $35A_1$ to $35A_6$ are arranged in order of decreasing thickness from the recording head part 34 to the reading head part 33.

On the other hand, each of the cores $35B_1$ to $35B_6$ is constituted by SiON and set such as to exhibit a refractive index of about 1.72 which is lower than that of the cores $35A_1$ to $35A_6$. The respective thicknesses of the cores $35B_1$ to $35B_6$ are set to about 50, 100, 150, 200, 250, and 350 nm. Namely, the cores $35B_1$ to $35B_6$ are arranged in order of increasing thickness from the recording head part 34 to the reading head part 33.

The laser light incident on thus constructed optical waveguide 35 from the laser diode 40 is deflected in the laminating direction, i.e., from the reading head part 33 to the recording head part 34, as shown in FIG. 6, while advancing. This is because such a structure of the optical waveguide 35 can be considered equivalent to a structure in which the refractive index increases from the reading head part 33 to the recording head part 34, while light has such a property as to deflect from the lower refractive index side to the higher refractive index side. Hence, the main magnetic pole layer 340 is positioned on the side where the laser light is deflected by the optical waveguide 35, while the magnetic pole end part 340a projects to the side where the laser light is deflected by the optical waveguide 35 (see FIG. 5 in particular).

The laser light incident on thus constructed optical waveguide 35 periodically changes its intensity as shown in (a) of FIG. 8. Therefore, it will be preferred if the length of the optical waveguide 35 is determined such that the intensity of the laser light becomes the highest at the light exit surface 353 of the optical waveguide 35.

Returning to FIG. 4, the optical waveguide 35 is covered with the insulating layer 38 and gap layer 341a except for the light exit surface 353, the light entrance surface 354, the part exposed to the outside (the part projecting more than the magnetic pole end part 340a on the medium-opposing surface S side), and the part in contact with the magnetic pole end part 340a. The insulating layer 38 and gap layer 341a are constituted by $Al_2O_3$, AlN, or the like which is a material having a refractive index lower than that of the cores $35A_1$ to $35A_6$, $35B_1$ to $35B_6$ constituting the optical waveguide 35 and function as claddings for the cores $35A_1$ to $35A_6$, $35B_1$ to $35B_6$.

Preferably, the material constituting the optical waveguide 35 is one exhibiting an etching rate lower than that of the other constituents with respect to an alkaline polishing solvent used for chemical mechanical polishing (CMP). Specific examples of the material constituting the optical waveguide 35 include not only SiON mentioned above, but also tantalum oxide, titanium oxide, silicon oxide, tantalum nitride, titanium nitride, silicon nitride, tantalum oxynitride, titanium oxynitride, and materials mainly composed thereof, which may contain additives such as niobium oxide, bismuth oxide, aluminum oxide, and silicon oxide. Namely, the etching rate of these materials with respect to the alkaline polishing solvent is lower than that of $Al_2O_3$, AlN, or the like constituting the insulating layer 38 and gap layer 341a. When the optical waveguide 35 is formed by silicon nitride (SiN) or silicon oxynitride (SiON), it will be preferred if about 3 wt % to 15 wt % of silicon nitride or silicon oxynitride is substituted by $ZrO_2$, $SnO_2$, $Cr_2O_3$, or $La_2O_3$ in order to improve its resistance to alkalis. Since the material constituting the main magnetic pole layer 340 or auxiliary magnetic pole layer 344 is a metal, which is soft, the etching rate of the optical waveguide 35 with respect to the alkaline polishing solvent is lower than that of the main magnetic pole layer 340 or auxiliary magnetic pole layer 344.

An interdevice shield layer 148 formed by a material similar to that of the lower and upper shield layers 330 and 334 is arranged between the reading head part 33 and optical waveguide 35. The interdevice shield layer 148 blocks the magnetic field generated in the recording head part 34 so as to keep the MR device 332 from sensing it, thereby functioning to suppress exogenous noise at the time of reading by the MR device 332. A backing coil part may further be formed between the reading head part 33 and optical waveguide 35.

As shown in FIGS. 4 to 6, the near-field-light-generating part 36 is a planar member arranged at the light exit surface 353 of the optical waveguide 35. The near-field-light-generating part 36 is positioned at a location where laser light having a high intensity is emitted in the light exit surface 353 (at substantially the center part in the light exit surface 353 of the core $35A_1$ in FIGS. 6 and 8), and buried in the core $35A_1$ such as to expose its end face at the light exit surface 353.

As shown in FIG. 6 and the like, the near-field-light-generating part 36 exhibits a triangular form when seen from the medium-opposing surface S, and is constituted by a conductive material (e.g., Au, Ag, Al, Cu, Pd, Pt, Rn, or Ir or an alloy combining such elements). A base 36d of the near-field-light-generating part 36 is arranged parallel to the integration surface 2202 of the slider substrate 220, i.e., parallel to the track width direction, while a vertex 36v of the near-field-light-generating part 36 opposing the base 36d is arranged closer to the main magnetic pole layer 340 than is the base 36d. Here, the linear distance H between the vertex 36v of the near-field-light-generating part 36 and the magnetic pole end part 340a is preferably 50 nm to 300 nm in the laminating direction. The form of the near-field-light-generating part 36 is preferably an isosceles triangle in which two base angles at both ends of the base 36d are equal.

When thus configured near-field-light-generating part 36 is irradiated with the laser light from the laser diode 40, electrons in the metal constituting the near-field-light-generating part 36 are subjected to plasma oscillations, so that electric fields are converged near the vertex 36v, whereby near-field light is generated so as to be directed from near the vertex 36v to a recording area R of the magnetic disk 10 (see FIG. 7). The spread of near-field light is about the radius of the near-field-light-generating part 36 in the vicinity of the vertex 36v, whereby the emitted light can simulatively be narrowed to a diffraction limit or less if the radius near the vertex 36v is not greater than the track width.

Returning to FIG. 3, the magnetic head part 32 in the slider 22 further comprises a pair of electrode pads 371 (see also FIG. 7) connected to input and output terminals of the reading head part 33, respectively, for signal terminals; a pair of electrode pads 373 (see also FIG. 7) connected to both ends of the recording head part 34, respectively, for signal electrodes; and a grounding electrode pad 375 (see also FIG. 4) electrically connected to the slider substrate 220 through a via hole 375a. The electrode pads 371, 373, 375 are formed on the exposed surface of the insulating layer 38. The electrode pad 375 is connected to the electrode pad 274 of the flexure 201 by a bonding wire (not depicted). Therefore, the potential of the slider substrate 220 is adjusted by the electrode pad 274 to the ground potential, for example.

[3.2] Light Source Unit

As shown in FIG. 3, the light source supporting substrate 230 in the light source unit 23 exhibits a planar form. As shown in FIG. 4, the light source supporting substrate 230 has a heat insulating layer 230a formed by alumina or the like and a conductor layer 230b formed by AlTiC (Al$_2$O$_3$.TiC) or the like which is conductive. The heat insulating layer 230a is bonded to the back face 2201 of the slider substrate 220 and acts as the bonding surface 2300 of the light source supporting substrate 230. An insulating layer 41 formed by an insulating material such as alumina is provided on a device forming surface 2303 which is a side face adjacent to the bonding surface 2300.

Electrode pads 47, 48 for driving the laser diode 40 are formed on a surface 411 (parallel to the integration surface 2202 of the slider substrate 220) which is a surface of the insulating layer 41 and intersects the medium-opposing surface S (see FIG. 3). The electrode pad 47 has a first part 47a extending in the track width direction in the center part of the surface 411 of the insulating layer 41 and a second part 47b extending from the end part of the first part 47a to the bottom face 2301 of the light source supporting substrate 230. On the other hand, the electrode pad 48 is formed at a position separated from the electrode pad 47 on the surface 411 of the insulating layer 41, and has a first part 48a extending in the track width direction in the center part of the surface 411 of the insulating layer 41 and a second part 48b extending from the end part of the first part 48a to the bottom face 2301 of the light source supporting substrate 230. The electrode pads 47, 48 are electrically connected to the electrode pads 247, 248 of the flexure 201, respectively, by reflow soldering.

As shown in FIG. 4, the electrode pad 47 is electrically connected to the conductor layer 230b of the light source supporting substrate 230 by a via hole 47c provided within the insulating layer 41. Therefore, the potential of the conductor layer 230b can be adjusted by the electrode pad 47 to the ground potential, for example. Together with the via hole 47c, the electrode pad 47 also functions as a heat conduction path for transferring the heat generated at the time of driving the laser diode 40 toward the conductor layer 230b.

Each of the electrode pads 47, 48 can be constituted, for example, by a foundation layer formed by Ta, Ti, or the like and a layer formed on the foundation layer by vacuum vapor deposition, sputtering, or the like with Au, Cu, or the like. The thickness of the foundation layer made of Ta, Ti, or the like can be set to about 10 nm, for example, while the thickness of the layer made of Au, Cu, or the like can be set to about 1 μm to 3 μm, for example.

As shown in FIG. 4, the laser diode 40 in the light source unit 23 is firmly attached onto the electrode pad 47 by a solder layer 42 made of a conductive solder material such as Au—Sn, so as to be electrically connected to the electrode pad 47. Here, a part of the electrode pad 47 is covered with the laser diode 40.

The laser diode 40 may have the same structure as one typically used for optical disk storage. For example, as shown in FIG. 9, the laser diode 40 has a structure in which an n-electrode 40a, an n-GaAs substrate 40b, an n-InGaAlP cladding layer 40c, a first InGaAlP guide layer 40d, an active layer 40e made of a multiple quantum well (InGaP/InGaAlP) or the like, a second InGaAlP guide layer 40f, a p-InGaAlP cladding layer 40g, an *n-GaAs current blocking layer 40h, a p-GaAs contact layer 40i, and a p-electrode 40j are successively laminated. Reflective films 50, 51 made of SiO$_2$, Al$_2$O$_3$, or the like for pumping oscillations by total reflection are formed in front and rear of a cleavage surface of the multilayer structure. One reflective film 50 is provided with an opening 50a at a position corresponding to the active layer 40e, while an area corresponding to the opening 50a in the surface formed with the reflecting film 50 is a light exit end 400 from which the laser light is emitted. When a voltage is applied to thus constructed laser diode 40 in the thickness direction, the laser light is emitted from the light exit end 400.

The emitted laser light has a wavelength $\lambda_L$ of about 600 nm to 650 nm, for example. However, care must be taken such that there is an appropriate pumping wavelength corresponding to the metal material of the near-field-light-generating part 36. When Au is used for the near-field-light-generating part 36, for example, the wavelength $\lambda_L$ of laser light is preferably near 600 nm.

Dimensions of the laser diode 40 can be set such as to have a width W40 of 200 μm to 350 μm, a length L40 of 250 μm to 600 μm, and a thickness T40 of 60 μm to 200 μm. Here, the width W40 of the laser diode 40 can be reduced to about 100 μm, for example, while its lower limit is the distance between the opposing ends of the current blocking layer 40h. However, the length of the laser diode 40 is related to the current density and cannot be made so small. In any case, it will be preferred if the laser diode 40 secures a considerable size taking account of handling at the time of mounting.

The laser diode 40 can also be driven by a power supply in the hard disk drive 1. In practice, the hard disk drive 1 is equipped with a power supply of about 2 V, for example, whose voltage is high enough for laser oscillations. The power consumption of the laser diode 40 is about several tens of mW and thus can sufficiently be covered by the power supply in the hard disk drive 1.

The n-electrode 40a of the laser diode 40 is secured to the electrode pad 47 by the solder layer 42 made of AuSn or the like. Here, the light exit end (light exit surface) 400 of the laser diode 40 faces down (in the −Z direction) in FIG. 4 (so as to be parallel to the bonding surface 2300), thereby opposing the light entrance surface 354 of the optical waveguide 35. For securing the laser diode 40 in practice, for example, a vapor deposition film of an AuSn alloy having a thickness of about 0.7 μm to 1 μm is formed on the surface of the electrode pad 47, the laser diode 40 is mounted thereon, and then heating to about 200° C. to 300° C. is effected by a hot plate or the like under a hot air blower.

The p-electrode 40j of the laser diode 40 is electrically connected to the electrode pad 48 by a bonding wire. The n-electrode 40a may be electrically connected to the electrode pad 48 by a bonding wire, while the p-electrode 40j may be secured to the electrode pad 47 by the solder layer 42. The laser diode 40 may be processed into steps on the side connected to the light source supporting substrate 230, so as to be electrically connected to the electrode pad 48 with no bonding wire.

When soldering with the above-mentioned AuSn alloy, the light source unit 23 is heated to a high temperature around 300° C., for example. In the thermally assisted magnetic head 21 in accordance with this embodiment, the light source unit 23 is manufactured separately from the slider 22, whereby the magnetic head part 32 of the slider 22 is not adversely affected by the high temperature.

The structures of the laser diode 40 and electrode pads 47, 48 are not limited to those in the above-mentioned embodiment. For example, the laser diode 40 may have a different structure using other semiconductor materials such as those based on GaAlAs. Other brazing materials can be used for soldering the laser diode 40 to electrodes. The laser diode 40 may be formed by epitaxially growing a semiconductor material directly on the light source supporting substrate 230.

[4] Circuit Configuration of Thermally Assisted Magnetic Head

The circuit configuration of the thermally assisted magnetic head 21 will now be explained with reference to FIG. 10.

One of leads constituting the wiring member 203 is electrically connected to the cathode of the laser diode 40 through the electrode pads 247, 47, while another lead is electrically connected to the anode of the laser diode 40 through the electrode pads 248, 48. When a driving current is supplied between the electrode pads 247, 248, the laser diode 40 emits light. This light irradiates the recording area R (see FIG. 7) of the magnetic disk 10 by way of the optical waveguide 35 and medium-opposing surface S.

Another pair of leads constituting the wiring member 203 are connected to both ends of the recording head part 34 through the electrode pads 237, bonding wires BW, and electrode pads 373. When a voltage is applied between the pair of electrode pads 237, the recording head part 34 is energized, whereby a writing magnetic field occurs. In the thermally assisted magnetic head 21, the laser light emitted from the laser diode 40 is incident on the light entrance surface 354 of the optical waveguide 35 and exits from the light exit surface 353 provided on the medium-opposing surface S, so as to irradiate the recording area R (see FIG. 7) of the magnetic disk 10. Here, temperature rises in the recording area R of the magnetic disk 10 opposing the medium-opposing surface S, whereby the coercivity of the recording area R decreases temporarily. Therefore, when the recording head 34 is energized in this coercivity decreasing period, so as to generate a writing magnetic field, information can be written in the recording area R.

Still another pair of leads constituting the wiring member 203 are connected to both ends of the reading head part 33 through the electrode pads 238, bonding wires BW, and electrode pads 371. When a voltage is applied between the pair of electrode pads 238, a sense current flows through the reading head part 33. Information written in the recording area R can be read by causing the sense current to flow through the reading head part 33.

[5] Method of Manufacturing Thermally Assisted Magnetic Head

A method of manufacturing the thermally assisted magnetic head 21 will now be explained with reference to FIG. 11.

First, the reading head part 33, optical waveguide 35, and recording head part 34 are successively formed on the slider substrate 220, so as to form a precursor 22a of the slider 22. Subsequently, lapping (polishing) for adjusting the height of the MR device 332 and near-field-light-generating part 36 is performed by chemical mechanical polishing (see (a) of FIG. 11). Here, the medium-opposing surface S is lapped in the depth direction from a lapping surface which is on the medium-opposing surface S side until the M device 332 and near-field-light-generating part 36 attain their predetermined heights.

At the time of lapping by chemical mechanical polishing, a polishing solvent (polishing slurry) doped with an alkaline pH adjuster such as KOH, NaOH, or $NH_4OH$ is used in general. In the thermally assisted magnetic head 21 in accordance with this embodiment, the etching rate of the optical waveguide 35 with respect to the alkaline polishing solvent is lower than that of the other constituents. Therefore, at the time when the lapping is terminated, the end part of the optical waveguide 35 on the medium-opposing surface S side projects more than the magnetic pole end part 340a on the medium-opposing surface S side (see (b) of FIG. 11).

[6] Operations

Operations of the thermally assisted magnetic head 21 in accordance with this embodiment will now be explained.

At the time of a writing or reading action, the thin-film magnetic head 21 hydrodynamically floats by a predetermined flying height above the surface of the rotating magnetic disk 10. Here, the ends of the reading head part 33 and recording head part 34 on the medium-opposing surface S side oppose the magnetic disk 10 with a minute spacing therefrom, so as to effect reading and writing by sensing and applying a data signal magnetic field, respectively.

When writing a data signal, the laser light propagated from the light source unit 23 through the optical waveguide 35 reaches the near-field-light-generating part 36, whereby near-field light is generated by the near-field-light-generating part 36. This near-field light enables thermally assisted magnetic recording.

When writing is performed on the magnetic disk 10 having a high coercivity by the thin-film magnetic head for perpendicular magnetic recording while employing the thermally assisted magnetic recording scheme, a recording density of 1 Tbits/$inch^2$ class, for example, can be achieved by extremely finely dividing recording bits.

In the foregoing embodiment, the main magnetic pole layer 340 is positioned on the side where the laser light is deflected by the optical waveguide 35, while the magnetic pole end part 340a projects to the side where the laser light is deflected by the optical waveguide 35. Therefore, the emitting position of light from the optical waveguide 35 and the magnetic pole end part 340a are closer to each other (see FIG. 5) than in the conventional thermally assisted magnetic heads, so that, immediately after heating the recording area R of the magnetic disk 10, magnetic recording can be performed in thus heated recording area R. Also, in this embodiment, the optical waveguide 35 projects more than the magnetic pole end part 340a on the medium-opposing surface S side. Therefore, as compared with a case where the light exit surface of the optical waveguide and the medium-opposing surface are flush with each other as in the conventional thermally assisted magnetic heads, a greater distance can be secured between the laser light and the magnetic pole end part 340a when the laser light passes near the magnetic pole end part 340a even if the laser light is deflected toward the main magnetic pole 340 (magnetic pole end part 340a) while advancing. As a result, the decrease in coercivity by heating of the magnetic pole end part 340a is very hard to occur, whereby the thermally assisted magnetic head 21 in accordance with this embodiment can realize high-density writing onto the magnetic disk 10 while making the emitting position of light from the optical waveguide 35 and the magnetic pole end part 340a closer to each other.

Also, since the optical waveguide 35 projects more than the magnetic pole end part 340a on the medium-opposing surface S side, the light exit surface 353 of the optical waveguide 35 is located closer to the magnetic disk 10 in this embodiment than in the conventional thermally assisted magnetic heads when the flying height from the magnetic disk 10 is the same. Therefore, the light emitted from the optical waveguide 35 irradiates the magnetic disk 10 with higher emission intensity. As a result, the thermally assisted magnetic head 21 in accordance with this embodiment can effectively prevent the magnetic disk 10 from being insufficiently heated, so as to enable favorable writing onto the magnetic disk 10.

With respect to the alkaline polishing solvent used for chemical mechanical polishing, the optical waveguide 35 exhibits an etching rate lower than that of the insulating layer 38, gap layer 341a, main magnetic pole layer 340, and the like in this embodiment. Therefore, lapping the medium-opposing surface S by chemical mechanical polishing in the process of manufacturing the thermally assisted magnetic head 21 can make the thermally assisted magnetic head 21 attain a structure in which the optical waveguide 35 projects more than the magnetic pole end part 340a on the medium-opposing surface S side.

In this embodiment, the magnetic pole end part 340a is in contact with the optical waveguide 35. This can make the emitting position of light from the optical waveguide 35 and the magnetic pole end part 340a further closer to each other.

Though a preferred embodiment of the present invention is explained in detail in the foregoing, the present invention is not limited to the above-mentioned embodiment. For example, though the near-field-light-generating part 36 has a triangular form in the above-mentioned embodiment, the vertex 36v may be flattened to yield a trapezoidal form. Also employable is a so-called "bowtie" structure in which a pair of triangular or trapezoidal plates are arranged such that their vertexes or shorter sides oppose each other while being separated by a predetermined distance therebetween. In this "bowtie" structure, electric fields converge strongly at its center part.

As the near-field-light-generating part 36, a minute opening smaller than the wavelength of laser light may be provided on the medium-opposing surface S side of the optical waveguide 35.

Though provided by one layer in this embodiment, the thin-film magnetic head 342 may be formed by two or more layers or as a helical coil.

The heat insulating layer 230a may be formed on the back face 2201 side of the slider substrate 220 or totally omitted.

For bonding the light source unit 23 and slider 22 to each other, adhesives other than the UV-curable adhesive, e.g., the solder layer made of AuSn or the like used for bonding the laser diode 40 and electrode pad 47 to each other, may also be employed.

It is apparent that various embodiments and modifications of the present invention can be embodied, based on the above description. Accordingly, it is possible to carry out the present invention in the other modes than the above best mode, within the following scope of claims and the scope of equivalents.

What is claimed is:

1. A thermally assisted magnetic head comprising:
    a main magnetic pole layer having a magnetic pole end part exposed at a medium-opposing surface opposing a magnetic recording medium; and
    an optical waveguide including a first layer and a second layer, adjacent to the first layer, having a refractive index higher than that of the first layer and deflecting thermally assisting light incident thereon into a laminating direction;
    wherein the main magnetic pole layer is positioned on a side where the light is deflected by the optical waveguide;
    wherein the magnetic pole end part projects to the side where the light is deflected by the optical waveguide;
    wherein the optical waveguide projects more than the magnetic pole end part on a medium-opposing surface side; and
    wherein a near-field-light-emitting part is provided at an end face in a longitudinal direction of the optical waveguide, the near-field-light-emitting part being located on the medium-opposing surface side.

2. A thermally assisted magnetic head according to claim 1, wherein, with respect to an alkaline polishing solvent used for chemical mechanical polishing, the optical waveguide exhibits an etching rate lower than that of the main magnetic pole layer and an insulating layer provided so as to surround the main magnetic pole layer.

3. A thermally assisted magnetic head according to claim 2, wherein the optical waveguide is formed by any of tantalum oxide, titanium oxide, silicon oxide, tantalum nitride, titanium nitride, silicon nitride, tantalum oxynitride, titanium oxynitride, and silicon oxynitride, or a material mainly composed thereof.

4. A thermally assisted magnetic head according to claim 1, wherein the magnetic pole end part is in contact with the optical waveguide.

5. A head gimbal assembly comprising:
    the thermally assisted magnetic head according to claim 1; and
    a suspension for supporting the thermally assisted magnetic head.

6. A hard disk drive comprising:
    the head gimbal assembly according to claim 5; and
    a magnetic recording medium opposing the medium-opposing surface.

* * * * *